United States Patent
Kitazawa

(10) Patent No.: US 12,518,421 B2
(45) Date of Patent: Jan. 6, 2026

(54) IMAGE PROCESSING APPARATUS, IMAGE PROCESSING METHOD, IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventor: Motoki Kitazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 17/829,507

(22) Filed: Jun. 1, 2022

(65) Prior Publication Data

US 2022/0392107 A1    Dec. 8, 2022

(30) Foreign Application Priority Data

Jun. 3, 2021    (JP) .................. 2021-093766

(51) Int. Cl.
  *G06T 7/73*    (2017.01)
  *G06T 3/40*    (2006.01)
  *G06T 7/246*   (2017.01)

(52) U.S. Cl.
  CPC .......... *G06T 7/74* (2017.01); *G06T 3/40* (2013.01); *G06T 7/248* (2017.01); *G06T 2207/20084* (2013.01)

(58) Field of Classification Search
  CPC ........ G06N 3/045; G06N 3/0464; G06N 3/09; G06T 2207/20084; G06T 2207/30196; G06T 3/40; G06T 7/20; G06T 7/248; G06T 7/74; G06V 10/454; G06V 10/761; G06V 10/82; G06V 20/52
  See application file for complete search history.

(56) References Cited

FOREIGN PATENT DOCUMENTS

JP    2018026108 A    2/2018

OTHER PUBLICATIONS

Liu, et al., "SSD: Single Shot MultiBox Detector," University of North Carolina, ECCV, pp. 1 to 17, Dec. 29, 2016.
Nicolai Wojke, et al., "Simple online and realtime tracking with a deep association metric," ICIP, pp. 1 to 5, Mar. 21, 2017.

*Primary Examiner* — Manuchehr Rahmjoo
(74) *Attorney, Agent, or Firm* — Venable LLP

(57) ABSTRACT

An image processing apparatus including a non-transitory computer-readable storage medium storing instructions, and a processor executing the instructions to calculate a loss based on a distance between features of tracking target objects in respective images, a distance between features of a tracking target object and a non-tracking target object in an image, and an overlapping rate between an image region of a tracking target object and an image region of a non-tracking target object in one or more images, to perform learning of a model for extracting, based on the loss, a feature amount of an object from an image, and to assign an ID to a second object according to a distance between a first feature amount, based on the completed learning model, of a first object assigned the ID in a first image, and a second feature amount, based on the learning model, of a second image object.

16 Claims, 10 Drawing Sheets

|  | CENTER POSITION COORDINATE (HORIZONTAL DIRECTION) | CENTER POSITION COORDINATE (VERTICAL DIRECTION) | WIDTH | HEIGHT | LABEL |
|---|---|---|---|---|---|
| OBJECT 901 | 312 | 276 | 126 | 331 | A |
| OBJECT 902 | 129 | 263 | 125 | 335 | B |
| OBJECT 903 | 496 | 271 | 130 | 338 | C |

IMAGE PROCESSING APPARATUS, IMAGE PROCESSING METHOD, IMAGE CAPTURING APPARATUS, AND NON-TRANSITORY COMPUTER-READABLE STORAGE MEDIUM

CROSS-REFERENCE TO PRIORITY APPLICATION

This application claims the benefit of Japanese Patent Application No. 2021-093766, filed Jun. 3, 2021, which is hereby incorporated by reference herein in its entirety.

BACKGROUND OF THE INVENTION

Field of the Invention

The present invention relates to a technique for tracking an object in an image.

Description of the Related Art

There are known techniques for tracking an object in an image, such as those using luminance or color information, those using template matching, or those using a Deep Neural Network. One of the methods using a Deep Neutral Network is called "Tracking by Detection". This method detects an object in an image, and tracks the object by associating the detected object with the object detected in the past. Nicolai Wojke, Alex Bewley, Dietrich Paulus: "Simple online and realtime tracking with a deep association metric (ICIP2017)" describes that the association is performed by using a feature amount acquired from a Neural Network learned with Metric Learning. Metric Learning is a method of learning conversion into space such that data with a higher similarity are distributed with a closer distance to each other in the space.

Let us consider a method of using a Neural Network that has learned with Metric Learning to extract a feature amount corresponding to each object and to track the object by associating each of the feature amounts with respective feature amounts in the past. The aforementioned method may fail in tracking by erroneously associating other objects resembling in appearance to a tracking target object, in a case when the attitude of the tracking object changes, or shielding has occurred, or the like.

SUMMARY OF THE INVENTION

The present invention provides a technique for correctly discriminating from other objects and tracking a tracking target object, even in the presence of objects resembling the tracking object in appearance.

According to a first aspect, the present invention provides an image processing apparatus comprising a calculation unit configured to calculate a loss based on a distance between features of tracking target objects in respective images, a distance between features of a tracking target object and a non-tracking target object in an image, and an overlapping rate between an image region of a tracking target object and an image region of a non-tracking target object in one or more images, a learning unit configured to perform learning of a model for extracting, based on the loss, a feature amount of an object from an image, and a tracking unit configured to perform a tracking process for tracking a tracking target object in an image, based on the model having completed learning by the learning unit.

According to a second aspect, the present invention provides an image capturing apparatus comprising an image capturing unit configured to capture images; and an image processing apparatus, wherein the image processing apparatus includes a calculation unit configured to calculate a loss based on a distance between features of tracking target objects in respective images, a distance between features of a tracking target object and a non-tracking target object in an image, and an overlapping rate between an image region of a tracking target object and an image region of a non-tracking target object in one or more images, a learning unit configured to perform learning of a model for extracting, based on the loss, a feature amount of an object from an image, and a tracking unit configured to perform a tracking process for tracking a tracking target object in an image, based on the model having completed learning by the learning unit.

According to a third aspect, the present invention provides an image processing method comprising calculating a loss based on a distance between features of tracking target objects in respective images, a distance between features of a tracking target object and a non-tracking target object in an image, and an overlapping rate between an image region of a tracking target object and an image region of a non-tracking target object in one or more images, performing learning of a model for extracting, based on the loss, a feature amount of an object from an image; and performing a tracking process for tracking a tracking target object in an image, based on the model having completed learning by the learning.

According to a fourth aspect, the present invention provides a non-transitory computer-readable storage medium storing a computer program for causing a computer to function as a calculation unit configured to calculate a loss based on a distance between features of tracking target objects in respective images, a distance between features of a tracking target object and a non-tracking target object in an image, and an overlapping rate between an image region of a tracking target object and an image region of a non-tracking target object in one or more images, a learning unit configured to perform learning of a model for extracting, based on the loss, a feature amount of an object from an image, and a tracking unit configured to perform a tracking process for tracking a tracking target object in an image, based on the model having completed learning by the learning unit.

Further features of the present invention will become apparent from the following description of exemplary embodiments (with reference to the attached drawings).

DESCRIPTION OF THE EMBODIMENTS

Figure 1:
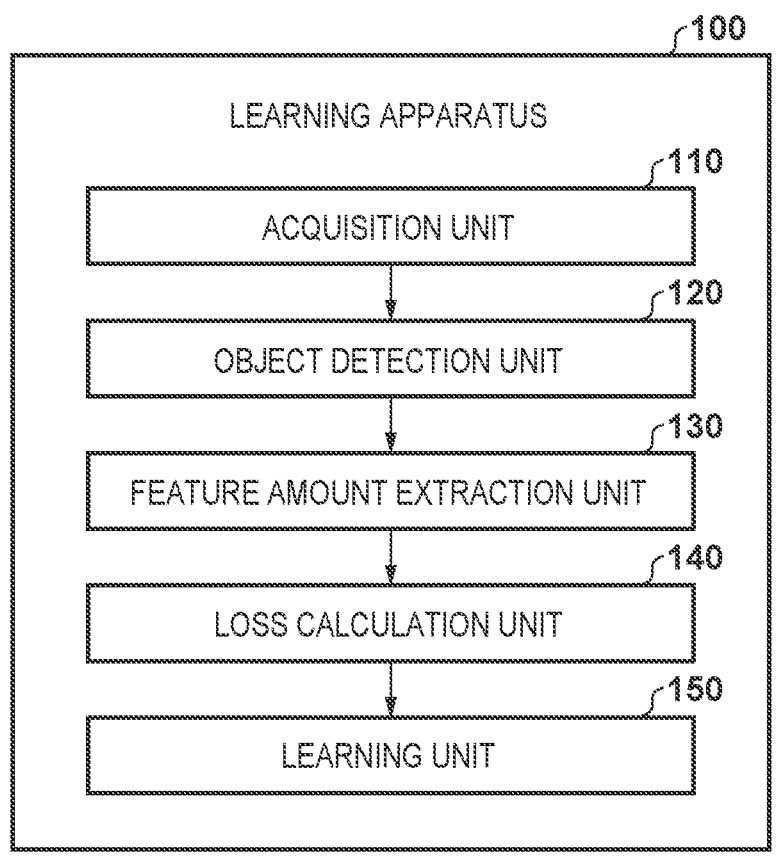
FIG. 1 is a block diagram illustrating an exemplary functional configuration of a learning apparatus 100.

Hereafter, embodiments will be described in detail with reference to the attached drawings. Note, the following embodiments are not intended to limit the scope of the claimed invention. Multiple features are described in the embodiments, but limitation is not made on an invention that requires all such features, and multiple such features may be combined as appropriate. Furthermore, in the attached drawings, the same reference numerals are given to the same or similar configurations, and a redundant description thereof is omitted.

First Embodiment

First, there will be described an image processing apparatus, which is a learning apparatus that performs learning of a learning model used for accurately discriminating a tracking target (tracking target object) from other objects (non-tracking target object) in continuously captured images, and tracking the tracking target object.

Figure 2:
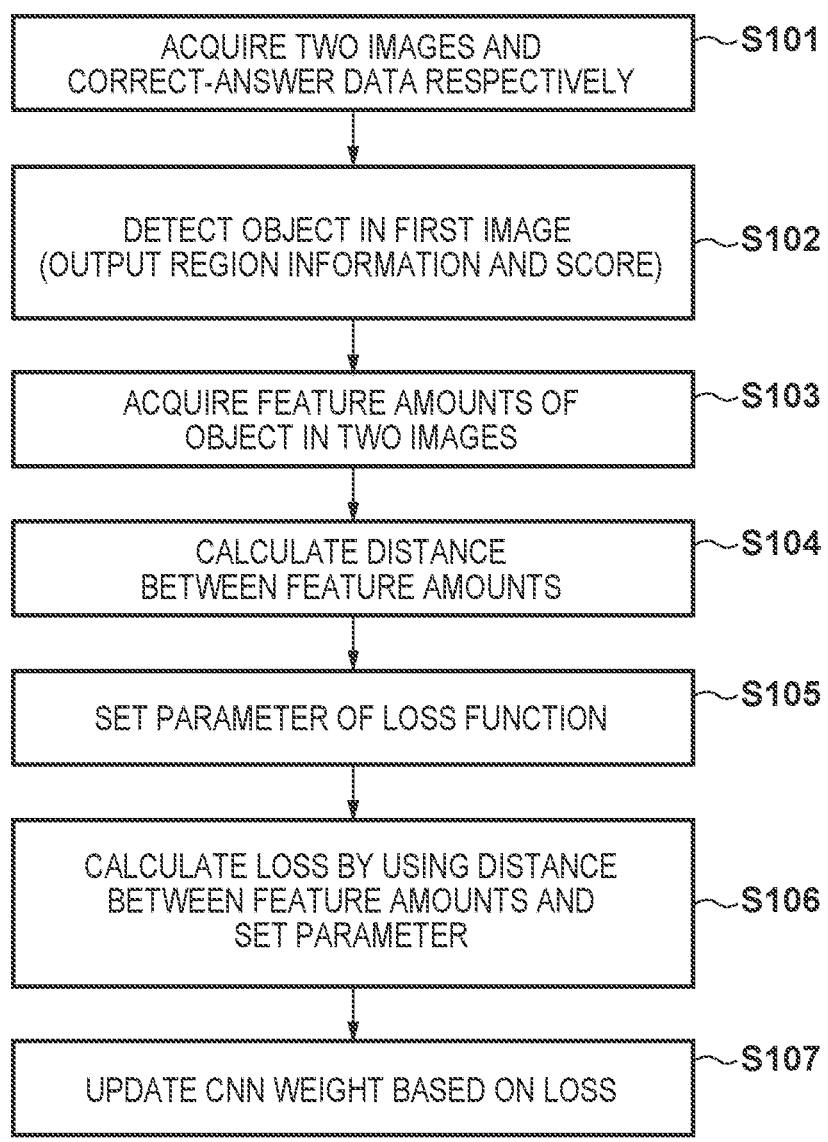
FIG. 2 is a flowchart of a learning process of a learning model by the learning apparatus 100.

FIG. 1 is a block diagram illustrating an exemplary functional configuration of a learning apparatus 100, according to the present embodiment. The learning process of the learning model by the learning apparatus 100 having the exemplary functional configuration illustrated in FIG. 1 will be described, referring to the flowchart of FIG. 2.

At step S101, an acquisition unit 110 acquires a first image and correct-answer data of the first image (first correct-answer data). The first correct-answer data, which is created in advance (known) for a tracking target object in the first image, includes region information indicating an image region of the tracking target object in the first image, and a label specific to the tracking target object. The region information indicating an image region of the tracking target object is information that includes, for example, in a case when the image region is a rectangular region, the center position of the rectangular region (position of the tracking target object), and the width and the height of the rectangular region. Here, although the center position of the rectangular region is defined as the position of the tracking target object in a case when the image region of the tracking target object is a rectangular region, any position of the rectangular region may be defined as the position of the tracking target object.

In addition, the acquisition unit 110 acquires a second image captured subsequent to the first image and correct-answer data of the second image (second correct-answer data). The second correct-answer data, which is created in advance (known) for a tracking target object in the second image, similarly to the first correct-answer data, includes region information indicating an image region of the tracking target object in the second image, and a label specific to the tracking target object. A same tracking target object in the first and the second images is provided with a same label.

The first image and the second image are respectively an image of a first frame and an image of a second frame subsequent to the first frame in a video image, for example. In addition, for example, the first image and the second image are, respectively, a still image of interest among a plurality of still images captured regularly or irregularly, and a still image captured after the still image of interest. In addition, a process may be performed such as cutting out a part of the acquired image, as necessary.

At step S102, an object detection unit 120 inputs the first image to an object detection CNN (Convolutional Neural Network), which is a learning model for object detection, and executes arithmetic processing of the object detection CNN. Accordingly, the object detection unit 120 acquires, for each object in the first image, region information indicating an image region of the object and a score of the object as a detection result of the object. The region information indicating the image region of the object is information that includes, for example in a case when the image region is a rectangular region, the center position of the rectangular region, and the width and the height of the rectangular region. In addition, the score of an object is a score that has a value range of zero to one, with a larger value indicating higher object characteristics. A technique for detecting an object in an image, includes Liu, "SSD: Single Shot Multibox Detector: ECCV 2016", or the like.

At step S103, a feature amount extraction unit 130 inputs the first image to the feature amount extraction CNN, which is a learning model for feature amount extraction, and executes arithmetic processing of the feature amount extraction CNN. Accordingly, the feature amount extraction unit 130 acquires a feature map (first feature map) representing the feature amount of each region of the first image equally divided both vertically and horizontally. The feature extraction unit 130 then identifies a corresponding position on the first feature map corresponding to the central position of the image region of the tracking target object indicated by the first correct-answer data, and acquires the feature amount at the identified corresponding position as "the feature amount of the tracking target object". In addition, the feature amount extraction unit 130 identifies a corresponding position on the first feature map corresponding to the center position of the image region indicated by the region information acquired at step S102, and acquires the feature amount at the identified corresponding position as "the feature amount of the non-tracking target object".

Similarly, the feature extraction unit 130 inputs the second image to the feature amount extraction CNN, which is a learning model for the feature amount extraction, and executes arithmetic processing of the feature amount extraction CNN. Accordingly, the feature amount extraction unit 130 acquires a feature map (second feature map) representing the feature amount of each region of the second image equally divided both vertically and horizontally. The feature extraction unit 130 then identifies a corresponding position on the second feature map corresponding to the center position of the image region of the tracking target object indicated by the second correct-answer data, and acquires the feature amount at the identified corresponding position as "the feature amount of the tracking target object".

Figure 4:
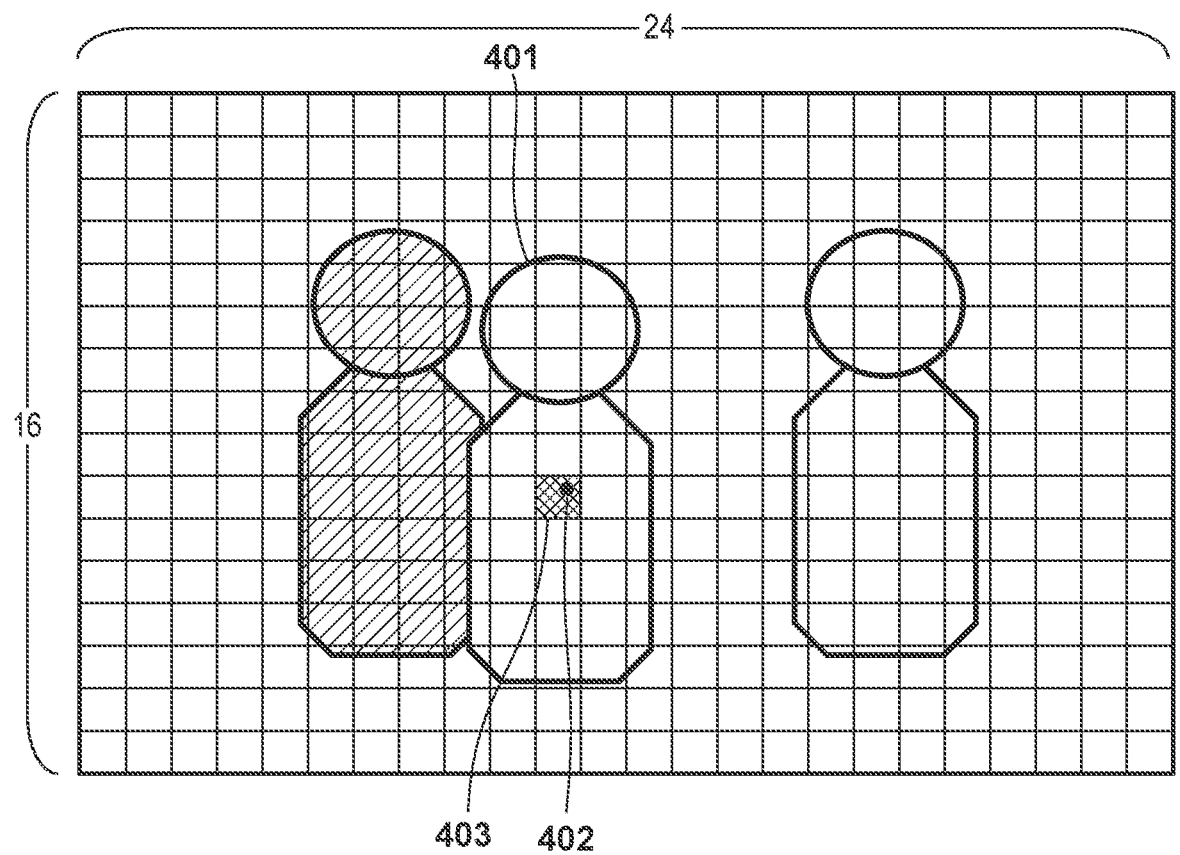
FIG. 4 is an explanatory diagram of a process of acquiring a feature amount of a tracking target object.

Here, a process for acquiring the feature amount of the tracking target object will be described, referring to FIG. 4. FIG. 4 illustrates a state in which a first feature map is superimposed on a first image having a size of a 640-pixel width and a 480-pixel height, the first feature map having registered therein a feature amount of each divided region of the first image when the first image is divided into twentyfour divided regions horizontally and sixteen divided regions vertically. The first feature map has registered therein 24×16 feature amounts having as many as C (arbitrary natural number) channels. With the position of the upper left corner of the first image being set as the origin (0, 0), the position (x, y) on the first image has a range of 0≤x≤639 and 0≤y≤439, whereas the position (p, q) on the first feature map (position by divided region) has a range of 0≤p≤23 and 0≤q≤15.

A position 402 corresponds to a position (x, y)=(312, 276) of the tracking target object indicated by the first correct-answer data. On this occasion, the feature amount extraction unit 130 calculates (312×24/640)=11.7, with p being eleven as a result of rounding down the decimal part of 11.7, and calculates (276×16/480)=9.2, with q being nine as a result of rounding down the decimal part of 9.2. Accordingly, the feature extraction unit 130 calculates the position (11, 9) on the first feature map corresponding to the position (312, 276) of the tracking target object on the first image. A rectangle 403 indicates a position (11, 9) on the first feature map corresponding to the position (312, 276) of the tracking target object on the first image. The feature amount extraction unit 130 then acquires the feature amount at the position 403 (an array element of 1×1×C at the position 403) as the feature amount of the tracking target object in the first image.

In addition, the feature amount extraction unit 130 acquires the feature amount of the tracking target object in the second image by performing a similar process also on the second image. In other words, the feature amount extraction unit 130 determines the position on the second feature map corresponding to the position of the tracking target object indicated by the second correct-answer data, and acquires the feature amount at the determined position (the array element of 1×1×C at the determined position) as the feature amount of the tracking target object in the second image.

Here, identification is performed using the aforementioned method of determining (p, q) from (x, y) also when identifying the corresponding position on the second feature map corresponding to the center position of the image region indicated by the region information acquired at step S102.

Figure 3A:
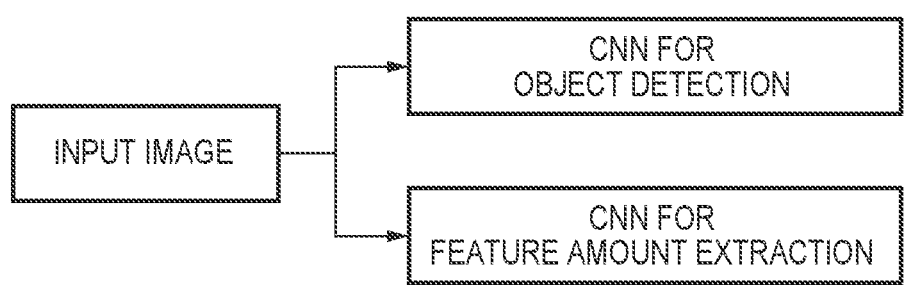
FIGS. 3A and 3B illustrate a relation between an object detection convolutional neural network (CNN) and a feature amount extraction CNN.
Figure 3B:
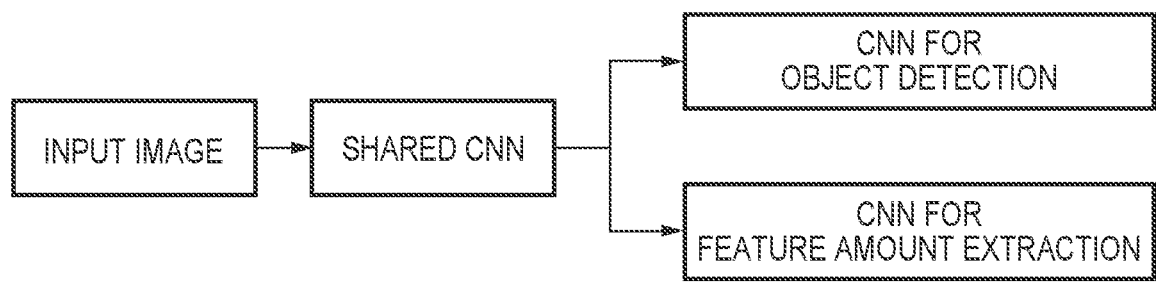

Here, a relation between the object detection CNN and the feature amount extraction CNN will be described, referring to FIG. 3. The object detection CNN and the feature amount extraction CN may be implemented in any configuration. For example, as illustrated in FIG. 3A, the object detection CNN and the feature amount extraction CNN may be provided separately, and configured such that each of them operates independently with respect to input images (first image and second image). In addition, as illustrated in FIG. 3B, there may be provided a shared CNN including components common to the object detection CNN and the feature amount extraction CNN, with components not included in the shared CNN in the object detection CNN being newly provided as an object detection CNN, and components not included in the shared CNN in the feature amount extraction CNN being newly provided as a feature amount extraction. In such a case, an input image is input to the shared CNN, which inputs the result of processing of the input image to the object detection CNN and the feature amount extraction CNN. The object detection CNN operates using the processing result output from the shared CNN as an input, and the feature amount extraction CNN operates using the processing result output from the shared CNN as an input.

Next, at step S104, a loss calculation unit 140 uses the feature amount calculated at step S103 to calculate a distance between feature amounts $d_1$, which is the Euclidean distance between the feature amount of the tracking target object in the first image and the feature amount of the tracking target object in the second image. In addition, the loss calculation unit 140 uses the feature amount calculated at step S103 to calculate a distance between feature amounts $d_2$, which is the Euclidean distance between the feature amount of the tracking target object in the first image and the feature amount of the non-tracking target object in the first image. The distance between feature amounts is a distance between feature amounts in a feature space to which each of the feature amounts belongs and a description thereof will be omitted, since the method of calculating the distance between feature amounts is known.

Next, at step S105, the loss calculation unit 140 calculates parameters of a loss function. In the present embodiment, a Triplet loss given below in formula 1 is used as the loss function.

$$\text{loss}=\max(rd_1-d_2+m,0) \quad \text{(Formula 1)}$$

The loss function, in which a loss occurs when $d_1$ becomes larger and $d_2$ becomes smaller, allows for acquiring a feature amount in which the distance between feature amounts with respect to same objects is smaller than the distance between feature amounts with respect to different objects.

In the aforementioned Formula 1, r and m are parameters of the loss function, with r being a distance parameter and m being a margin parameter. Setting a greater r results in learning that the distance between feature amounts between same objects becomes lesser, and setting a greater m results in learning that the distance between feature amounts between different objects becomes greater. In the present embodiment, dynamically setting the parameters using the correct-answer data and the region of the object detected at step S102 causes learning of a feature amount with a higher object discrimination performance.

Here, the loss function to be used is not limited to any specific function provided that it can perform distance learning. For example, Contrastive loss or Softmax loss may be used as the loss function.

Figure 5A:
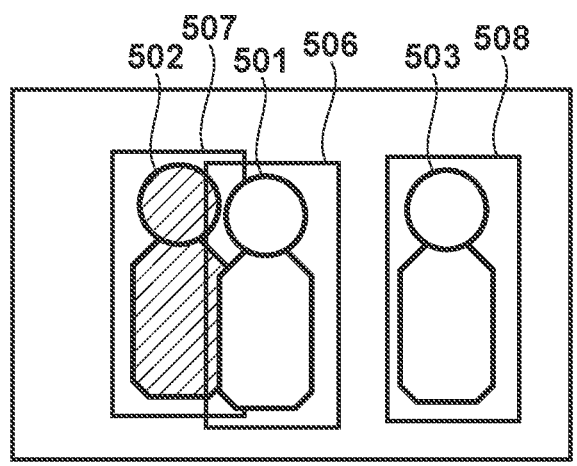
FIGS. 5A and 5B are explanatory diagrams of a process for calculating $d_1$, $d_2$, r and m.

Here, a process of calculating $d_1$, $d_2$, r and m will be described, referring to the specific example illustrated in FIG. 5. FIG. 5A illustrates the first image, and FIG. 5B illustrates the second image.

The first image in FIG. 5A includes a tracking target object 501, and non-tracking target objects 502 and 503. A rectangle 506 indicates an image region of the tracking target object 501 defined by the first correct-answer data. A rectangle 507 indicates an image region of the non-tracking target object 502 detected at step S102. A rectangle 508 indicates an image region of the non-tracking target object 503 detected at step S102.

Figure 5B:
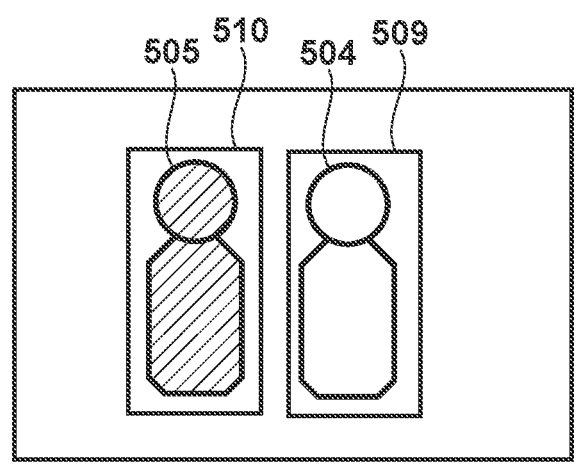

The second image in FIG. 5B includes a tracking target object 504 and a non-tracking target object 505. A rectangle 509 indicates an image region of the tracking target object 504 defined by the second correct-answer data, and a rectangle 510 indicates an image region of the non-tracking target object 505 detected at step S102.

In such a case, the feature extraction unit 130 calculates the distance between feature amounts $d_1$ between a feature amount at a corresponding position on the first feature map corresponding to the "position of the tracking target object 501 in the first image" indicated by the first correct-answer data, and a feature amount at a corresponding position on the second feature map corresponding to the "position of the tracking target object 504 in the second image" indicated by the second correct-answer data.

In addition, the feature amount extraction unit 130 selects one (e.g., the non-tracking target object 502 in FIG. 5A) of the non-tracking target objects 502 and 503 as a selected object, and calculates a distance between feature amounts $d_2$ between a feature amount at a corresponding position on the first feature map corresponding to the position detected at step S102 for the selected object, and a feature amount at a corresponding position on the first feature map corresponding to the "position of the tracking target object 501 in the first image" indicated by the first correct-answer data. When a plurality of non-tracking target objects are included in the first image, the selection method for a selected object from the plurality of non-tracking target objects is not limited to any specific selection method. For example, a non-tracking target object located at a position closest to the position (in the closest proximity) of the tracking target object is selected as the selected object.

In addition, the feature amount extraction unit 130 calculates the distance parameter r using Formula 2 below, and calculates the margin parameter m using Formula 3 below.

$$r=1 \quad \text{(Formula 2)}$$

$$m=m_0+\text{IoU} \quad \text{(Formula 3)}$$

Here, $m_0$ is an arbitrary real number. IoU (Intersection over Union) indicates an overlapping rate of areas of two image regions. In the case of FIGS. 5A and 5B, the overlapping rate between the image region 506 of the tracking target object 501 and the image region 507 of the non-tracking target object 502 selected as the selected object is calculated as the IoU.

At step S106, the loss calculation unit 140 determines the loss "loss" by calculating Formula 1 using $d_1$, $d_2$, r and m acquired by the aforementioned processing.

Figure 6:
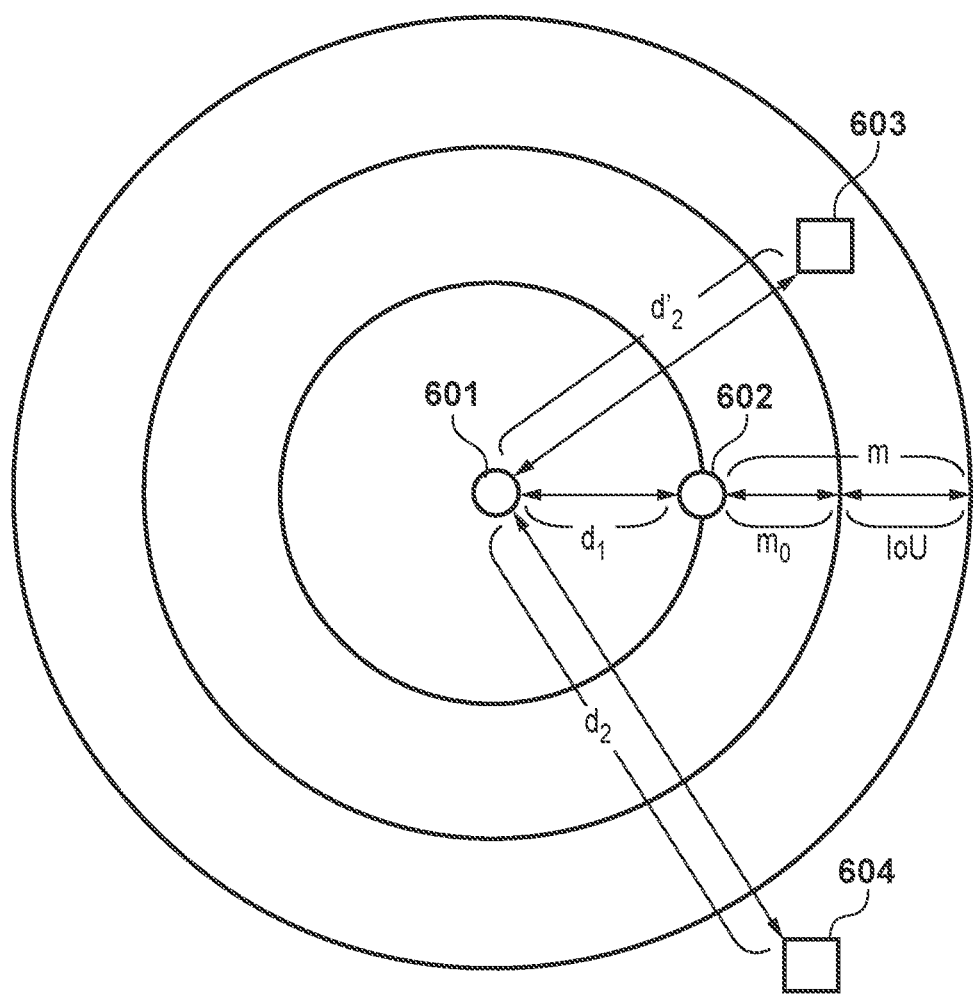
FIG. 6 is an image diagram illustrating a distance between feature amounts plotted on a two-dimensional space.

FIG. 6 is an image diagram having the distances between feature amounts plotted on a two-dimensional space, when the loss is calculated by the method according to the present embodiment. A feature amount 601 is the feature amount of the tracking target object in the first image, and a feature amount 602 is the feature amount of the tracking target object in the second image. Distance $d_1$ indicates the distance between feature amounts between the feature amount 601 and the feature amount 602. A feature amount 603 and a feature amount 604 are feature amounts of non-tracking target objects in the first image. Distance $d_2$ indicates the distance between the feature amount 601 and the feature amount 604, and $d_2'$ indicates the distance between the feature amount 601 and the feature amount 603. In addition, m, $m_0$ and IoU are margin parameters described in Formula 3.

According to the aforementioned method, when no overlap is occurring between the image region of the tracking target object and the image region of the non-tracking target object in the first image, learning is performed so that the distance between feature amounts $d_2'$ exceeds the sum of the distance between feature amounts $d_1$ and the margin parameter $m_0$. When, on the other hand, an overlap has occurred in the image region of the tracking target object and the image region of the non-tracking target object in the first image, learning is performed so that the distance between feature amounts $d_2$ exceeds the sum of the distance between feature amounts $d_1$ and the margin parameter m. Accordingly, it is possible to perform learning so that the distance between feature amounts becomes greater for a non-tracking target object having a higher IoU with the image region of the tracking target object, i.e., a non-tracking target object located closer to the tracking target object and having a higher risk of invoking switching to erroneous tracking.

Here, the loss function is not limited to the aforementioned form, provided that the loss function changes the parameters based on the IoU with the image region of the tracking target object. In addition, when calculating the loss, it is conceivable to prepare a plurality of sets of the first images and the second images, to perform the aforementioned processing on each set to calculate the loss for each set, and to determine the average of the losses calculated for respective sets as the final loss.

At step S107, the learning unit 150 performs learning of the feature amount extraction CNN by updating the parameters (weight values, etc.) in the feature amount extraction CNN so as to minimize the "loss" calculated at step S106. Here, the learning unit 150 may simultaneously perform learning of the object detection CNN in addition to learning of the feature amount extraction CNN. Updating of the parameters, such as weights, may be performed using error back propagation method, for example.

Next, there will be described an image processing apparatus, which is a tracking apparatus that performs a process for tracking the tracking target object in an image using the learned CNN described above. An exemplary functional configuration of a tracking apparatus 200 according to the present embodiment is illustrated as a block diagram in FIG. 7. The tracking process of the tracking target object by the tracking apparatus 200 having the exemplary functional configuration illustrated in FIG. 7 will be described, referring to the flowchart of FIG. 8.

At step S201, an image acquisition unit 210 acquires a single captured image. The single captured image, which is a captured image recently captured among continuously captured images, may be, for example, a captured image of the latest frame in a video image, or a still image recently captured among still images captured regularly or irregularly.

At step S202, an object detection unit 220 inputs the captured image acquired at step S201 to the object detection CNN and executes arithmetic processing of the object detection CNN. Accordingly, the object detection unit 220 acquires, for each of the objects appearing in the captured image acquired at step S201, region information indicating an image region of the object and a score of the object, as a detection result of the object.

At step S203, a feature amount extraction unit 230 acquires a feature map of the captured image by inputting the captured image acquired at step S201 to the feature amount extraction CNN and executing arithmetic processing of the feature amount extraction CNN. The feature extraction unit 230 then identifies, for each of the objects acquired at step S202, a corresponding position on the feature map corresponding to the central position of the image region indicated by the region information of the object, and acquires the feature amount at the identified corresponding position as "the feature amount of the object".

Subsequently, when the captured image acquired at step S201 is the captured image acquired first after the start of the tracking process (the captured image at the initial time point), the process proceeds to step S204. When, on the other hand, the captured image acquired at step S201 is the second or later captured image after starting the tracking process (the captured image not at the initial time point), the process proceeds to step S207.

At step S204, a feature amount storage unit 240 assigns, to the feature amount of each object acquired at step S203, an ID (object ID) specific to the object. For example, object ID=1, 2, 3, . . . are assigned to objects in descending order of the score.

Subsequently, at step S205 (in a case when the process has proceeded from step S204 to step S205), the feature amount storage unit 240 stores, in the tracking apparatus 200, the feature amount of each object to which an object ID has been assigned at step S204.

At step S207, a feature amount collating unit 250 selects a yet-to-be-selected one among the feature amounts of respective objects (the feature amount of the current time point) acquired at step S203 as a selected feature amount. The feature amount collating unit 250 then acquires, from the feature amounts stored in the tracking apparatus 200, n feature amounts (stored feature amounts), n being a natural number, in the order of closeness to the current time point, for each of the objects. The feature amount collation unit 250 calculates the distance between each of the acquired stored feature amount and the selected feature amount (the manner of calculating the distance between feature amounts is similar to that described above). Here, the feature amount collating unit 250 may calculate, for each of the objects, a single stored feature amount from the n stored feature amounts (e.g., average value of the n stored feature amounts) acquired for respective objects, and calculate the distance between the calculated single stored feature amount for each object and the selected feature amount.

At step S208, the feature amount collating unit 250 identifies the shortest distance between feature amounts among the distances between feature amounts calculated at step S207. The feature amount collating unit 250 then assigns, to an object having the selected feature amount, the object ID assigned to the object having the stored feature amount corresponding to the identified shortest distance between feature amounts. Additionally, in a case when "the object ID assigned to the object having the stored feature amount corresponding to the shortest distance between feature amounts among the distances between feature amounts calculated at step S207" is already assigned to another object, the feature amount collating unit 250 issues a new object ID and assigns the new object ID to the object having the selected feature amount. Although it is conceivable to assign object IDs to objects in descending order of the score, the method is not limited thereto.

Performing such processing at step S207 and processing at step S208, on all the feature amounts of the objects acquired at step S203, allows for assigning object IDs to all the objects detected at step S202. Note that, the aforementioned processing for assigning an object ID to the feature amount of the current time point is merely exemplary and not intended to limit the invention to the aforementioned processing. For example, the Hungarian algorithm may be used. In addition, the following processing may be performed at steps S207 and S208.

At step S207, the feature amount collating unit 250 selects a yet-to-be-selected one among the feature amounts of respective objects (the feature amount of the current time point) acquired at step S203 as a selected feature amount. The feature amount collating unit 250 then calculates the distance between the feature amount of the object stored in the tracking apparatus 200 in the past (stored feature amount), and the selected feature amount (the manner of calculating the distance between feature amounts is similar to that described above).

At step S208, the feature amount collating unit 250 identifies a distance between feature amounts that falls below a threshold value among the distances between feature amounts calculated at step S207. Here, upon identifying a plurality of distances between feature amounts as the distance between feature amounts that falls below the threshold value, the feature amount collating unit 250 identifies the shortest distance between feature amounts among the identified plurality of distances between feature amounts. The feature amount collating unit 250 then assigns, to the object of the selected feature amount, the object ID assigned to an object having a stored feature amount whose storage timing is most recent among the stored feature amounts corresponding to the identified distance between feature amounts. In addition, when none of the distances between feature amounts calculated at step S207 falls below the threshold value, the feature amount collating unit 250 issues a new object ID to assign the new object ID to the object having the selected feature amount.

In other words, when the distance between the feature amount of the current time point and the feature amount of interest stored in the tracking apparatus 200 in the past falls below the threshold value, the object ID of the object having the feature amount of interest is assigned to the feature amount of the current time point, in order to associate the object having the feature amount of the current time point and the object having the feature amount of interest.

Subsequently, at step S205 (in a case when the process has proceeded from step S208 to step S205), the feature amount storage unit 240 stores, in the tracking apparatus 200, the feature amount of each object to which an object ID has been assigned at step S208.

Figure 8:
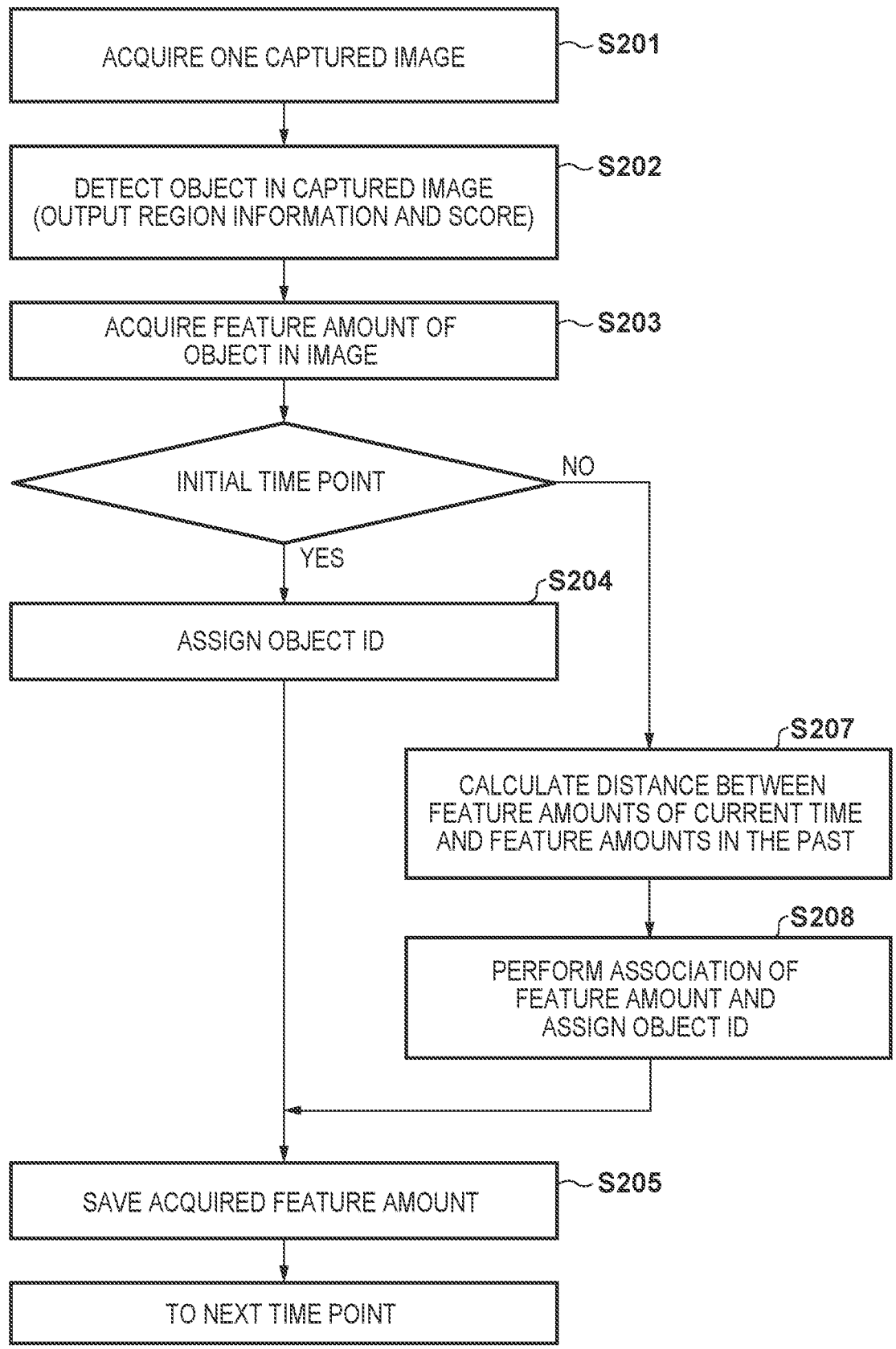
FIG. 8 is a flowchart of a tracking process of a tracking target object by the tracking apparatus 200.

In addition, the feature amount collating unit 250 outputs, as a tracking result, the object ID stored in the tracking apparatus 200 at step S205 and the image region of the object having the object ID assigned thereto. The tracking result may be displayed together with the object ID of the object by the tracking apparatus 200 or another apparatus, with a frame indicating the image region of the object included in the tracking result being superimposed on the captured image, or the tracking result may be transmitted to an external apparatus. Here, the processing according to the aforementioned flowchart illustrated in FIG. 8 is performed for each captured image subjected to the tracking process.

As such, in the present embodiment, learning is performed so that the distance between feature amounts becomes greater for a non-tracking target object located closer to the tracking target object in the captured image and having a higher risk of invoking switching to erroneous tracking. Accordingly, it is possible to acquire a feature amount with a higher discrimination performance of the object, and tracking can be performed with high precision even in the presence of objects resembling the tracking object in appearance.

Modification Example 1

In the present modification example, there will be described a case in which each object (tracking target object and/or non-tracking target object) in an image is provided with correct-answer data. The correct-answer data according to the present modification example will be described, referring to FIGS. 9A and 9B.

Figures 9A, 9B:
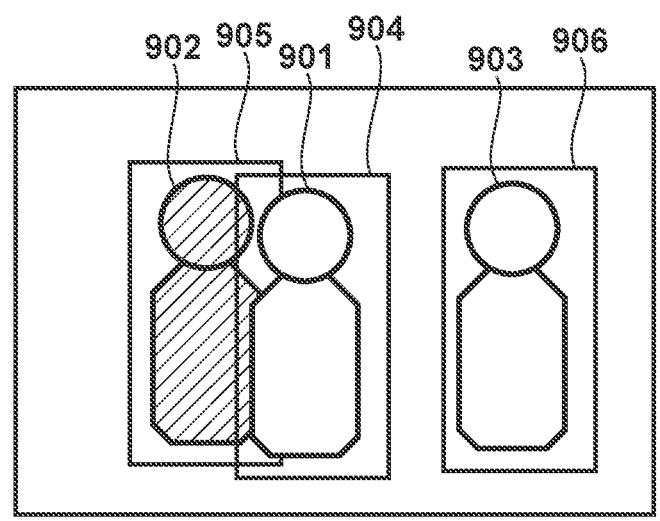
FIGS. 9A and 9B illustrate an exemplary configuration of correct-answer data according to a modification example 1.

FIG. 9A illustrates an exemplary configuration of correct-answer data as a table having registered therein the center position (horizontal position coordinates and vertical position coordinates), width, height, and labels of image regions 904, 905 and 906 of objects 901, 902 and 903, respectively, in the image of FIG. 9B. Here, it is assumed that the first image and the second image include one or more objects to which a same label is provided.

When calculating the loss, the loss calculation unit 140 regards an object to which a certain label is assigned as a tracking target object, and objects having assigned thereto labels other than the certain label as non-tracking target objects. In addition, the aforementioned calculation may also be performed on objects having other labels assigned thereto, and the final loss may be determined by calculating the average of the losses.

Modification Example 2

Figure 10:
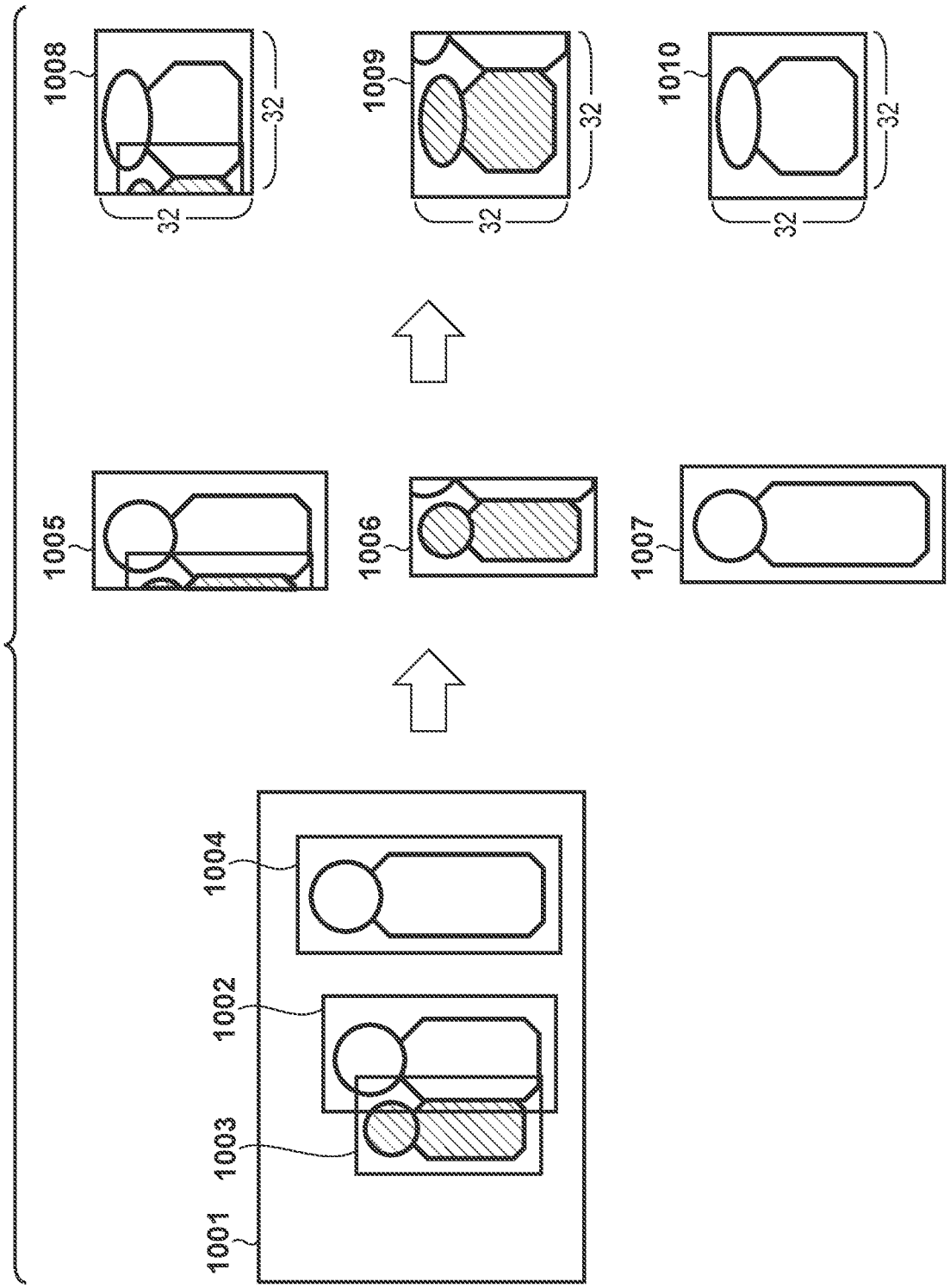
FIG. 10 is an explanatory diagram of a method of acquiring a feature amount of a tracking target object and a non-tracking target object, according to a modification example 2.

In the present modification example, a method of acquiring feature amounts of a tracking target object and non-tracking target objects by the feature amount extraction unit 130 will be described, taking FIG. 10 as an example. In an image 1001, a region 1002 is an image region of a tracking target object indicated by the correct-answer data, whereas regions 1003 and 1004 are image regions of non-tracking target objects detected by the object detection unit 120. An image 1005 is an image in the region 1002, an image 1006 is an image in the region 1003, and an image 1007 is an image in the region 1004.

The feature amount extraction unit 130 converts (resizes, or the like) the images 1005 to 1007 into images of a defined image size (here, 32-pixels×32-pixels). In other words, the feature amount extraction unit 130 converts the image 1005 into a 32-pixel×32-pixel image 1008, converts the image 1006 into a 32-pixel×32-pixel image 1009, and converts the image 1007 into a 32-pixel×32-pixel image 1010.

The feature amount extraction unit 130 then acquires the feature amount of an object corresponding to the image 1008 by inputting the image 1008 to the feature amount extraction CNN and executing arithmetic processing of the feature amount extraction CNN. In addition, the feature amount extraction unit 130 acquires the feature amount of an object corresponding to the image 1009 by inputting the image 1009 to the feature amount extraction CNN and executing arithmetic processing of the feature amount extraction CNN. In addition, the feature amount extraction unit 130 acquires the feature amount of an object corresponding to the image 1010 by inputting the image 1010 to the feature amount extraction CNN and executing the arithmetic processing of the feature amount extraction CNN. It is conceivable to acquire the feature amount of the object as a vector of arbitrary number of dimensions.

Performing such processing on the first and the second images allows for acquiring feature amounts of objects in respective images, and, therefore, it suffices to perform similar processing to that of the first embodiment in the following processing.

Modification Example 3

In the present modification example, the distance parameter r and the margin parameter m described above are calculated according to Formula 4 and Formula 5, respectively.

$$r = 1 + IoU_1 \cdot IoU_2 \quad \text{(Formula 4)}$$

$$m = m_0 \quad \text{(Formula 5)}$$

Here, $m_0$ is an arbitrary positive real number. The calculation method of $IoU_1$ and $IoU_2$ will be described, referring to FIGS. 11A and 11B illustrates the first image, and FIG. 11B illustrates the second image.

Figure 11A:
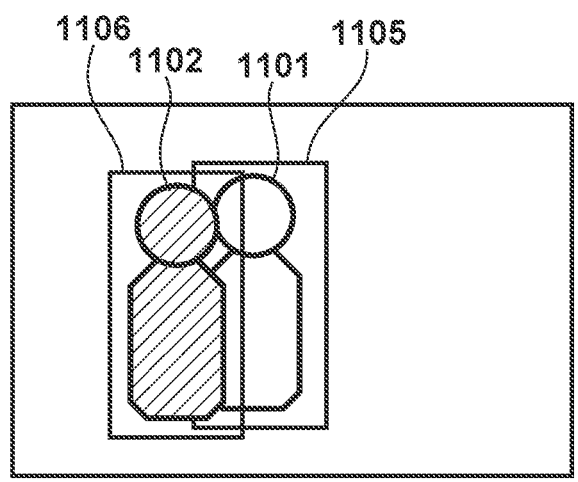
FIGS. 11A and 11B illustrate a calculation method of $IoU_1$ and $IoU_2$.

As illustrated in FIG. 11A, the first image includes a tracking target object 1101 and a non-tracking target object 1102 (a non-tracking target object located closest to the tracking target object 1101 when a plurality of non-tracking target objects are included in the first image). $IoU_1$ is the IoU of an image region 1105 of the tracking target object 1101 and an image region 1106 of the non-tracking target object 1102.

Figure 11B:
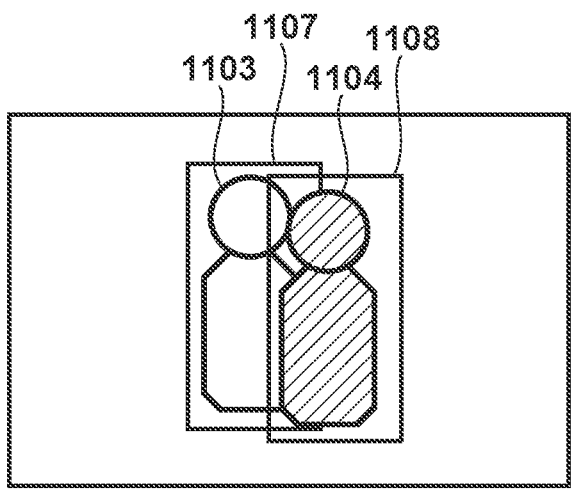

In addition, as illustrated in FIG. 11B, the second image includes a tracking target object 1103 and a non-tracking target object 1104 (a non-tracking target object located closest to the tracking target object 1103 when a plurality of non-tracking target objects are included in the second image). $IoU_2$ is the IoU of an image region 1107 of the tracking target object 1103 and an image region 1108 of the non-tracking target object 1104.

In other words, r takes a value greater than one when there exists a non-tracking target object including a part overlapping with the image region of the tracking target object in both the first image and the second image. Calculating the loss by the aforementioned method allows for performing learning so that the distance between feature amounts becomes lesser when there exists a non-tracking target object close to the tracking target object. Accordingly, it is possible to acquire a feature amount useful for robustly discriminating a tracking target object, even in a case when the tracking target object is shielded by another object or shielding another object.

Here, the loss function is not limited to the aforementioned form provided that the loss function changes the parameters when there exists a non-tracking target object including a part overlapping the image region of the tracking target object in both the first image and the second image.

Modification Example 4

In the present modification example, a plurality of sets of the first images and the second images are prepared when calculating the loss, the aforementioned processing is performed on respective sets to calculate the loss of each set, and the final loss is defined as the total sum of the losses calculated for respective sets and weighted according to the scores of the non-tracking target objects corresponding to respective sets. In the present modification example, the loss "loss" is calculated according to the Formula 6 below.

$$\text{loss} = \frac{1}{N} \sum_{i=1}^{N} p_i \cdot \text{loss}_i \quad \text{(Formula 6)}$$

Here, N is the total number of sets, $\text{loss}_i$ is the loss calculated for the i-th set. In addition, $p_i$ is a score of the non-tracking target object selected when determining $d_2$ of Formula 1 for the i-th set. Calculating the loss by the aforementioned method derives a greater contribution to the loss by a non-tracking target object having a high score, i.e., an object having a higher risk of invoking switching to erroneous tracking. Accordingly, it becomes possible to learn focusing on important cases for the performance of tracking, and to perform efficient learning. Here, weighting of the loss is not limited to the aforementioned form, provided that the weighing of the loss is changed according to the score.

Modification Example 5

In the present modification example, Contrastive loss is used as the loss function. Contrastive loss is represented by Formula 7 below.

$$\text{loss} = 1/2[y(rd)^2 + (1-y)\max(m-d, 0)^2] \quad \text{(Formula 7)}$$

Here, d indicates the distance between feature amounts corresponding to two objects, and y is one when the two objects are a same object, or zero when the two objects are different objects. With the aforementioned loss function, learning is performed so that d becomes lesser when the two objects are a same object, or d becomes greater when the two objects are different objects. In addition, r and m respectively indicate the distance parameter and the margin parameter, and learning is performed similarly to the first embodiment, so that setting a greater r derives a lesser distance between feature amounts between the same objects, and setting a greater m derives a greater distance between feature amounts between different objects. When setting the parameters, Formula 2 and Formula 3, for example, can be used similarly to the first embodiment.

Modification Example 6

In the first embodiment, CNN is used as the learning model. However, models applicable to the learning model are not limited to CNN, and other models (e.g., machine learning models) may also be used.

In the first embodiment and its modification examples, there has been described an exemplary method of calculating a loss based on the distance between feature amounts of tracking target objects in respective images, the distance between respective feature amounts of a tracking target object and a non-tracking target object in an image, and the overlapping rate between an image region of a tracking target object and an image region of a non-tracking target object in one or more images. However, the method of determining the loss using the pieces of information is not limited to the aforementioned method.

In addition, although the learning apparatus 100 and the tracking apparatus 200 have been described as separate image processing apparatuses in the first embodiment, they may be integrated as a single image processing apparatus. In other words, the processing described to be performed by the learning apparatus 100 and the processing described to be performed by the tracking apparatus 200 may be performed by a single image processing apparatus. In such a case, it is possible to configure an image capturing apparatus having mounted thereon, for example, an image capturing unit that captures a video image or captures a still image regularly or irregularly, and an image processing apparatus that can execute both the processing described to be performed by the learning apparatus 100 and the processing described to be performed by the tracking apparatus 200. Such an image capturing apparatus allows for executing the operation of the learning apparatus 100 (learning of the object detection CNN and the feature amount extraction CNN) using captured images captured by the image capturing apparatus itself. The image capturing apparatus can thus execute the tracking process of objects in the captured images captured by the image capturing apparatus itself after the aforementioned operation, using the object detection CNN and the feature amount extraction CNN which have completed learning.

In addition, although the Euclidean distance is used as the distance between feature amounts in the first embodiment, the distance between feature amounts, may be determined by arbitrary calculation, without being limited to any specific calculation method (any type of distance may be employed as the distance between feature amounts).

Second Embodiment

Figure 7:
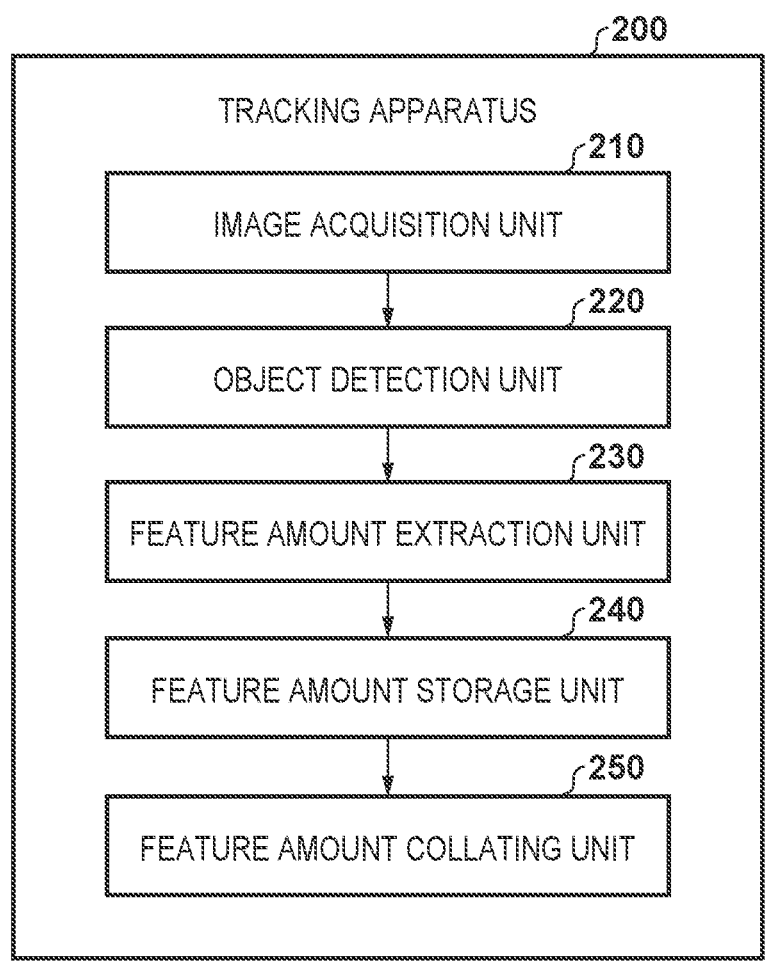
FIG. 7 is a block diagram illustrating an exemplary functional configuration of a tracking apparatus 200.

The functional units illustrated in FIGS. 1 and 7 may be implemented by hardware, or may be implemented by software (computer program). In the latter case, a computer apparatus that can execute such a computer program is applicable to the learning apparatus 100 and the tracking apparatus 200 described above. An exemplary hardware configuration of the computer apparatus applicable to the learning apparatus 100 and the tracking apparatus 200 will be described, referring to the block diagram of FIG. 12.

A CPU 1201 executes various processing using computer programs and data stored in a RAM 1202 or a ROM 1203. Accordingly, the CPU 1201 controls the operation of the computer apparatus as a whole, as well as executing or controlling various processing described to be performed by the learning apparatus 100 or the tracking apparatus 200.

The RAM 1202 includes an area for storing computer programs and data loaded from the ROM 1203 or an external storage device 1206. In addition, the RAM 1202 includes an area for storing data received from the outside via an I/F 1207. In addition, the RAM 1202 includes a work area to be used when the CPU 1201 executes various processing. As such, the RAM 1202 can provide various areas as appropriate.

The ROM 1203 has stored therein setting data of the computer apparatus 200, computer programs and data related to activation of the computer apparatus 200, computer programs and data related to basic operations of the computer apparatus 200, or the like.

An operation unit 1204, which is a user interface, such as a keyboard, a mouse, a touch panel, can input, by user operation thereon, various instructions to the CPU 1201.

A display unit 1205, including a liquid crystal screen or a touch panel screen, can display results of processing by the CPU 1201 in the form of images, characters, or the like. For example, results of the aforementioned tracking process can be displayed on the display unit 1205. Here, the display unit 1205 may be a projection apparatus such as a projector that projects images or characters.

An external storage device 1206 is a large-capacity information storage device such as a hard disk drive. The external storage device 1206 has stored therein an operating system (OS), as well as computer programs and data for causing the CPU 1201 to execute or to control the various processing described to be performed by the learning apparatus 100 or the tracking apparatus 200. The data stored in the external storage device 1206 includes data described to be stored in the learning apparatus 100 or the tracking apparatus 200, data treated as known data in the foregoing description, data related to the CNN, or the like. The computer programs and data stored in the external storage device 1206 are loaded to the RAM 1202, as appropriate, according to the control by the CPU 1201, which are then subjected to processing by the CPU 1201.

An I/F 1207 is a communication interface configured for conducting data communication with external apparatuses. For example, the I/F 1207 can be connected to an image capturing apparatus that can capture video images or still images, a server apparatus holding video images or still images, a network to which such apparatuses are connected, or the like. In such a case, the video images or the still images captured by the image capturing apparatus, and the video images or still images supplied from the server apparatus are supplied to the computer apparatus via the I/F 1207, and the supplied video images or still images are stored in the RAM 1202 or the external storage device 1206.

The CPU 1201, the RAM 1202, the ROM 1203, the operation unit 1204, the display unit 1205, the external storage device 1206, and the I/F 1207 are all connected to a system bus 1208.

Figure 12:
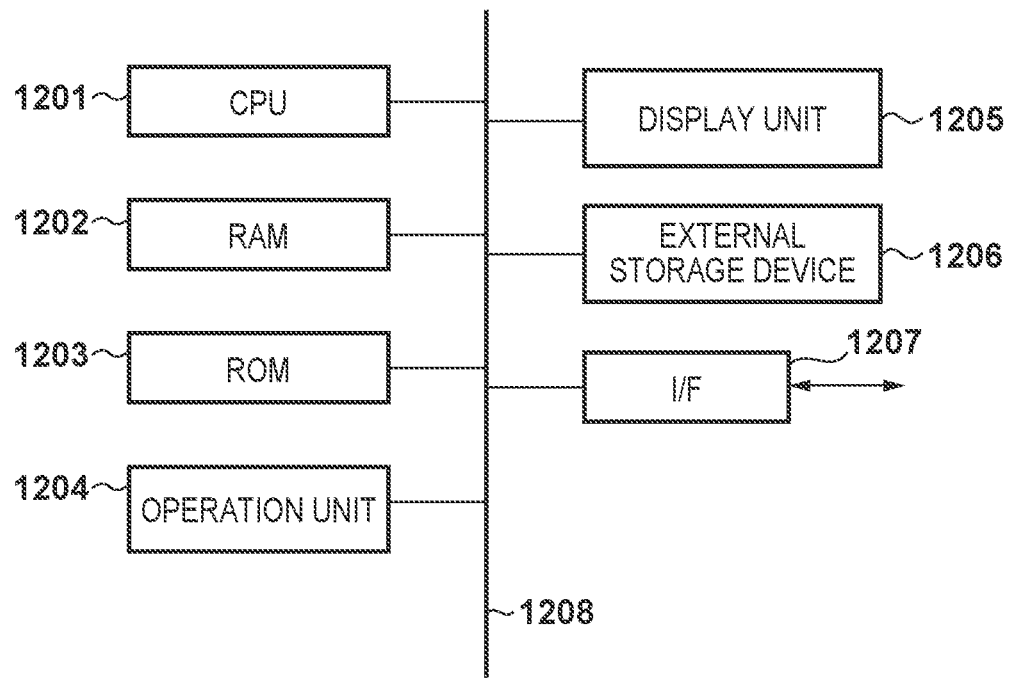
FIG. 12 is a block diagram illustrating an exemplary hardware configuration of a computer apparatus.

Note that the hardware configuration illustrated in FIG. 12 is an exemplary hardware configuration of a computer apparatus applicable to the learning apparatus 100 or the tracking apparatus 200, and may be varied/modified as appropriate.

In addition, numerical values, timing of processing, order of processing, entity of processing, transmission destination/transmission source/storage location of data (information), or the like, which have been used in the aforementioned embodiments and modification examples are taken as an example to provide specific description, and not intended to limit the invention to such an example.

In addition, a part of or all of the aforementioned embodiments and modification examples may be used in combination as appropriate. In addition, a part or all of the aforementioned embodiments and modification examples may be selectively used.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a non-transitory computer-readable storage medium storing instructions; and
a processor that executes the instructions so as to:
(1) calculate a loss based on (a) a distance between features of tracking target objects in respective images, (b) a distance between features of a tracking target object and a non-tracking target object in an image, and (c) an overlapping rate between an image region of a tracking target object and an image region of a non-tracking target object in one or more images;
(2) perform learning of a model for extracting, based on the loss, a feature amount of an object from an image;
(3) assign an identification (ID) to a second object according to a distance between (a) a first feature amount, based on the model having completed learning, of a first object assigned the ID in a first image, and (b) a second feature amount, based on the model having completed learning, of the second object in a second image;
(4) store, in a tracking apparatus, a feature amount of each object to which an object ID has been assigned;
(5) output, as a tracking result, the object ID stored in the tracking apparatus and an image region of the object having the object ID assigned thereto; and
(6) display the output tracking result together with the associated object ID,
wherein the storing in the tracking apparatus comprises storing in a disk drive of the tracking apparatus,
wherein the displaying further comprises displaying, on a display screen, a frame indicating the image region of the object such that the frame is superimposed on a captured image, and
wherein the learning is performed such that a distance between feature amounts becomes larger for a non-tracking target object located closer to a tracking target object in a captured image.

2. The image processing apparatus according to claim 1, wherein features of a tracking target object and a non-tracking target object in a third image are acquired from a feature map that is a result of an arithmetic operation of the model to which the third image is input, and
wherein a feature amount of a tracking target object in a fourth image subsequent to the third image is acquired from a feature map that is a result of an arithmetic operation of the model to which the fourth image is input.

3. The image processing apparatus according to claim 2, wherein the non-tracking target object in the first image is a non-tracking target object located closest to the tracking target object in the first image.

4. The image processing apparatus according to claim 1, wherein an image region of an object in a third image is resized,
wherein a result of an arithmetic operation of the model to which the resized image region is input is acquired as a feature amount of the object in the third image,
wherein an image region of the object in a fourth image subsequent to the third image is resized, and
wherein a result of an arithmetic operation of the model to which the resized image region is input is acquired as a feature amount of the object in the fourth image.

5. The image processing apparatus according to claim 1, wherein a loss is calculated based on (a) a distance between features of tracking target objects in respective images, (b) a distance between features of a tracking target object and a non-tracking target object in an image, and (c) an overlapping rate between an image region of a tracking target object and an image region of a non-tracking target object in an image.

6. The image processing apparatus according to claim 1, wherein a loss is calculated based on (a) a distance between features of tracking target objects in respective images, a distance between features of a tracking target object and a non-tracking target object in an image, (b) an overlapping rate between an image region of a tracking target object and an image region of a non-tracking target object in a third image, and (c) an overlapping rate between an image region of a tracking target object and an image region of a non-tracking target object in a fourth image subsequent to the first image.

7. The image processing apparatus according to claim 1, wherein the loss is calculated for each set of images,
wherein a total sum of losses that are calculated for respective sets of images, and are weighted, is calculated as the final loss according to a score indicating object characteristics acquired in detection of the non-tracking target object, and
wherein learning of the model is performed based on the final loss.

8. The image processing apparatus according to claim 1, wherein the loss is calculated for each set of images,
wherein an average of losses is calculated, as a final loss, for respective sets of images, and
wherein learning of the model based on the final loss is performed.

9. The image processing apparatus according to claim 1, further comprising the display screen.

10. The image processing apparatus according to claim 9, further comprising a RAM and an operation unit configured to accept user input.

11. The image processing apparatus according to claim 10, wherein the operation unit comprises a touch panel.

12. The image processing apparatus according to claim 10, wherein the ID is assigned to the second object by identifying a smallest distance between feature amounts among a plurality of distances between feature amounts.

13. An image capturing apparatus comprising:
an image capturing unit configured to capture images;
a non-transitory computer-readable storage medium storing instructions; and
a processor that executes the instructions so as to:
(1) calculate a loss based on (a) a distance between features of tracking target objects in respective images, (b) a distance between features of a tracking target object and a non-tracking target object in an image, and (c) an overlapping rate between an image region of a tracking target object and an image region of a non-tracking target object in one or more images;
(2) perform learning of a model for extracting, based on the loss, a feature amount of an object from an image;
(3) assign an identification (ID) to a second object according to a distance between (a) a first feature amount, based on the model having completed learning, of a first object assigned the ID in a first image, and (b) a second feature amount, based on the model having completed learning, of the second object in a second image;
(4) store, in a tracking apparatus, a feature amount of each object to which an object ID has been assigned;
(5) output, as a tracking result, the object ID stored in the tracking apparatus and an image region of the object having the object ID assigned thereto; and
(6) display the output tracking result together with the associated object ID,
wherein the storing in the tracking apparatus comprises storing in a disk drive of the tracking apparatus,
wherein the displaying further comprises displaying, on a display screen, a frame indicating the image region of the object such that the frame is superimposed on a captured image, and
wherein the learning is performed such that a distance between feature amounts becomes larger for a non-tracking target object located closer to a tracking target object in a captured image.

14. An image processing method comprising:
calculating a loss based on (a) a distance between features of tracking target objects in respective images, (b) a distance between features of a tracking target object and a non-tracking target object in an image, and (c) an overlapping rate between an image region of a tracking target object and an image region of a non-tracking target object in one or more images;
performing learning of a model for extracting, based on the loss, a feature amount of an object from an image;
assigning an identification (ID) to a second object according to a distance between (a) a first feature amount, based on the model having completed learning, of a first object assigned the ID in a first image, and (b) a second feature amount, based on the model having completed learning, of the second object in a second image;
storing, in a tracking apparatus, a feature amount of each object to which an object ID has been assigned;
outputting, as a tracking result, the object ID stored in the tracking apparatus and an image region of the object having the object ID assigned thereto; and
displaying the output tracking result together with the associated object ID,
wherein the storing in the tracking apparatus comprises storing in a disk drive of the tracking apparatus,
wherein the displaying further comprises displaying, on a display screen, a frame indicating the image region of the object such that the frame is superimposed on a captured image, and
wherein the learning is performed such that a distance between feature amounts becomes larger for a non-tracking target object located closer to a tracking target object in a captured image.

15. The method according to claim 14, wherein the method is an apparatus-implemented method performed by a system comprising a processor, a RAM, a ROM, and the display screen.

16. A non-transitory computer-readable storage medium storing a computer program for causing a computer to function as a plurality of units comprising:
a calculation unit configured to calculate a loss based on (a) a distance between features of tracking target objects in respective images, (b) a distance between features of a tracking target object and a non-tracking target object in an image, and (c) an overlapping rate between an image region of a tracking target object and an image region of a non-tracking target object in one or more images;
a learning unit configured to perform learning of a model for extracting, based on the loss, a feature amount of an object from an image;
an assignment unit to assign an identification (ID) to a second object according to a distance between (a) a first feature amount, based on the model having completed learning, of a first object assigned the ID in a first image, and (b) a second feature amount, based on the model having completed learning, of the second object in a second image;

a storing unit to store, in a tracking apparatus, a feature amount of each object to which an object ID has been assigned;

an output unit to output, as a tracking result, the object ID stored in the tracking apparatus and an image region of the object having the object ID assigned thereto; and a display unit to display the output tracking result together with the associated object ID, wherein the storing in the tracking apparatus comprises storing in a disk drive of the tracking apparatus, wherein the displaying further comprises displaying, on a display screen, a frame indicating the image region of the object such that the frame is superimposed on a captured image, and wherein the learning is performed such that a distance between feature amounts becomes larger for a non-tracking target object located closer to a tracking target object in a captured image.

* * * * *